United States Patent
Lynn

(10) Patent No.: US 10,420,336 B2
(45) Date of Patent: Sep. 24, 2019

(54) DUCK DECOY APPARATUS

(71) Applicant: Tommy Lynn, Gilbertsville, KY (US)

(72) Inventor: Tommy Lynn, Gilbertsville, KY (US)

(*) Notice: Subject to any disclaimer, the term of this patent is extended or adjusted under 35 U.S.C. 154(b) by 161 days.

(21) Appl. No.: 15/844,331

(22) Filed: Dec. 15, 2017

(65) Prior Publication Data
US 2019/0008141 A1  Jan. 10, 2019

Related U.S. Application Data

(60) Provisional application No. 62/434,871, filed on Dec. 15, 2016.

(51) Int. Cl.
*A01M 31/06* (2006.01)
*B61B 7/00* (2006.01)

(52) U.S. Cl.
CPC ............ *A01M 31/06* (2013.01); *B61B 7/00* (2013.01)

(58) Field of Classification Search
CPC ................................ A01M 31/06; B61B 7/00
USPC .................................................................. 43/3
See application file for complete search history.

(56) References Cited

U.S. PATENT DOCUMENTS

| | | | | |
|---|---|---|---|---|
| 2,028,849 A * | 1/1936 | Shay | ............... | A01M 31/06 43/3 |
| 2,129,781 A * | 9/1938 | Park | ............... | A01M 31/06 43/3 |
| 2,595,966 A * | 5/1952 | Majors | ............... | A01M 31/06 114/300 |
| 4,535,560 A * | 8/1985 | O'Neil | ............... | A01M 31/06 43/3 |
| 5,832,649 A * | 11/1998 | Kilgore | ............... | A01M 31/06 43/2 |
| 6,044,581 A * | 4/2000 | Shipman | ............... | A01M 31/06 244/153 R |
| 6,374,529 B1 * | 4/2002 | Petroski | ............... | A01M 31/06 43/3 |
| 6,430,863 B1 * | 8/2002 | Krag | ............... | A01M 31/06 43/3 |
| 2003/0204983 A1 * | 11/2003 | Porter | ............... | A01M 31/06 43/3 |
| 2008/0184610 A1 * | 8/2008 | Pfeifle | ............... | A01M 31/06 43/3 |
| 2014/0208628 A1 * | 7/2014 | McHugh | ............... | A01M 31/06 43/2 |
| 2014/0245653 A1 * | 9/2014 | Foster | ............... | A01M 31/06 43/3 |
| 2016/0174541 A1 * | 6/2016 | Goodman | ............... | A01M 31/06 43/3 |
| 2017/0118978 A1 * | 5/2017 | Denson | ............... | A01M 31/06 |
| 2017/0295775 A1 * | 10/2017 | Smith | ............... | B65H 75/4486 |

FOREIGN PATENT DOCUMENTS

| | | | | |
|---|---|---|---|---|
| CA | 2800695 A1 * | 7/2013 | ............ | A01M 31/06 |
| GB | 2441103 A * | 2/2008 | ............ | A01M 31/06 |

* cited by examiner

*Primary Examiner* — Christopher P Ellis
(74) *Attorney, Agent, or Firm* — Julie Tennyson; Marcum Tennyson PLLC

(57) ABSTRACT

This invention relates to a system and method of placing a decoy spread to simulate landing. The user attaches a tree line to a tree and a pulley. The user attaches a pulley line to a reel and a decoy line. Then the user attaches one or more decoys to a loop on the decoy line. Then the user attaches the decoy line to a float.

8 Claims, 5 Drawing Sheets

DUCK DECOY APPARATUS

CROSS REFERENCE TO RELATED APPLICATIONS

This application claims the benefit of U.S. Provisional Application Ser. No. 62/434,871 filed by Lynn on Dec. 15, 2017 and entitled "Duck Decoy Lines," which is incorporated herein by reference.

FIELD OF INVENTION

The invention relates to duck decoy spreads for hunting.

BACKGROUND OF THE INVENTION

Hunters often use duck decoys to attract live ducks to a pond or field. The present invention will enable the hunter to simulate ducks landing on a pond or field to entice live ducks to land as well. The method and apparatus allows a decoy line to be moved up and down to simulate landing. Various duck decoys and lines are on the market. However, there has been a long-felt unmet need to simulate a more realistic landing scenario.

The apparatus is designed to help simulate a three-dimension look to any display of hunting decoys.

SUMMARY OF THE INVENTION

The present invention is a system and method of attaching duck decoys to lines and moving the lines up and down to simulate ducks landing on a pond.

DETAILED DESCRIPTION OF THE INVENTION

Figure 1:
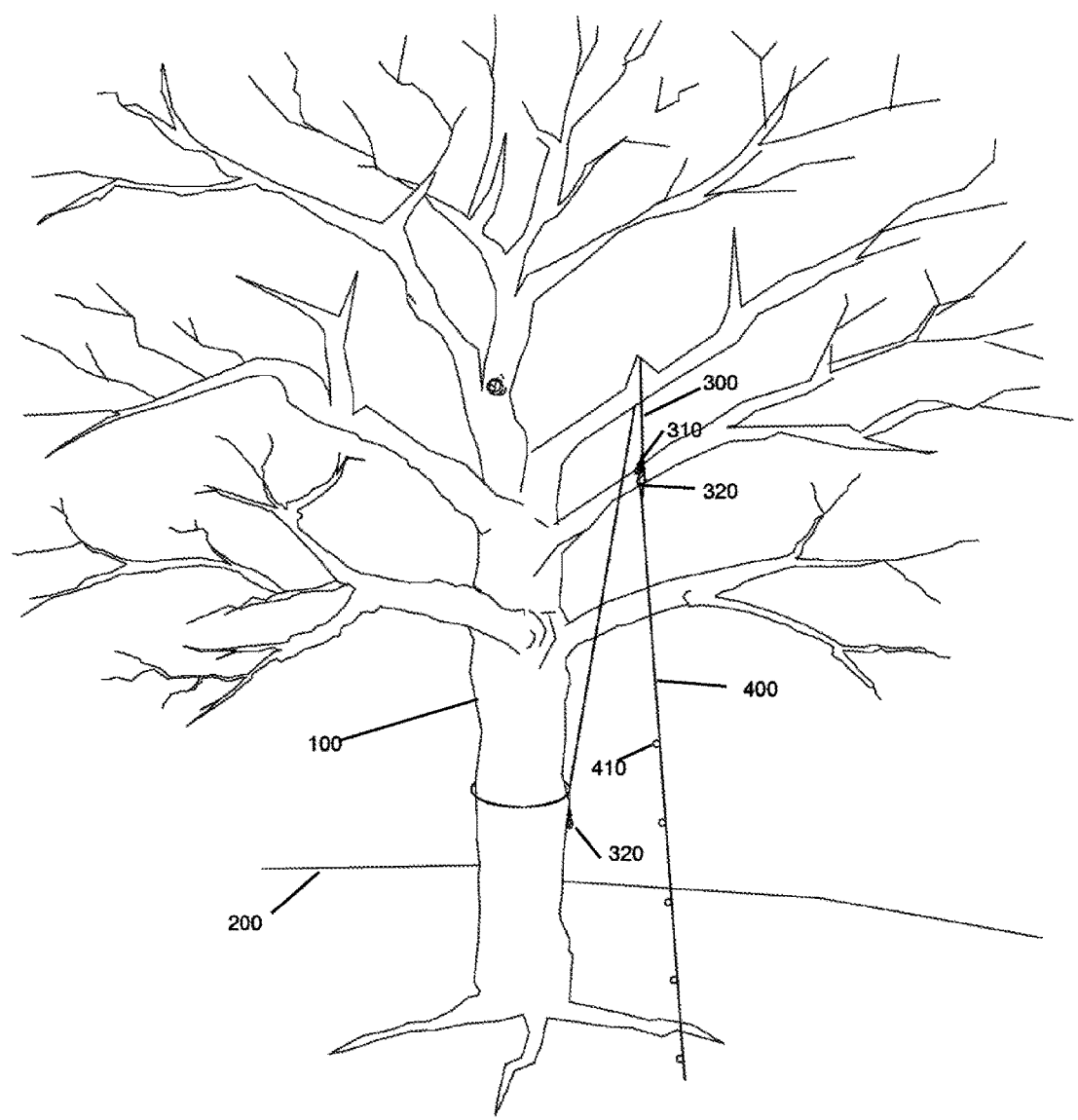
FIG. 1 is a front view of the present invention.

The decoy spread system described in FIG. 1 shows a tree line 300 attached to a tree 100. The tree line 300 has two tree line fasteners 320. The tree line fastener 320 can include a snap, clip, clasp, bolt snap, swivel snap, carabiner, hook, snap hook, knot, and latch. The tree line fastener 320 can be used to fasten the tree line 300 around the tree 100 and to itself. The tree line fastener 320 can be used to attached the tree line 300 to another line such as the decoy line 400. The tree line 300 can have a tree line weight 310 attached to make it easier to throw the tree line 300 over part of the tree 100 and extend the line toward the ground 200. The tree line weight 310 may be any size or shape. The decoy line 400 can have a number of loops 410 to which to attach the still decoys 420 or moving decoys 430. The still decoys 420 can be any kind of bird in various stages of flight but it is permanently fixed in one stage of flight. The moving decoy 430 is capable of changing position. The moving decoy 430 can be a bird which has two or more positions. For example, the moving may be robotic or described as "robo" in some way. But the moving decoy 430 could also have wings that appear to flap in the wind.

Figure 2:
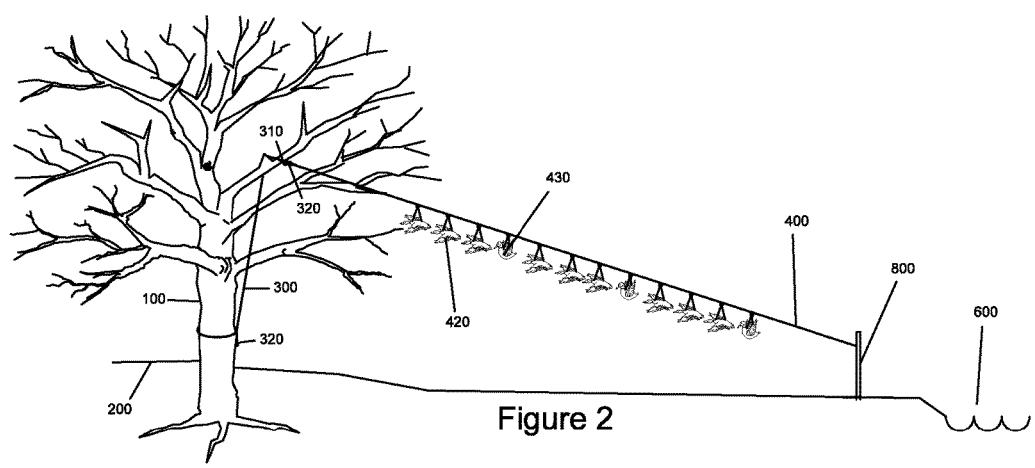
FIG. 2 is a front view of the present invention.

The decoy spread system in FIG. 2 shows same system as in FIG. 1 except the still decoys 420 and moving decoys 430 have been added. One end of the decoy line 400 has been attached to a float 500. The float 500 can be driven into the ground. The float 500 can have a rod inside it. The tree line 300 or the decoy line 400 can be wrapped or wound around the float to store the lines. If the tree line 300 or decoy line 400 are used near a pond 600 or other body of water the float 500 will float. In the alternative, a buoy may be used on the water. The float 500 can be any color that will blend into the surroundings including camouflage and can be made of any material that will float. The decoy line 400 is attached to the float 500 so that the decoy line 400 is preferably about one foot off the ground or water at all times. This prevents moving decoys 430 from being damaged from water causing their robotic mechanisms to stop functioning.

Figure 3:
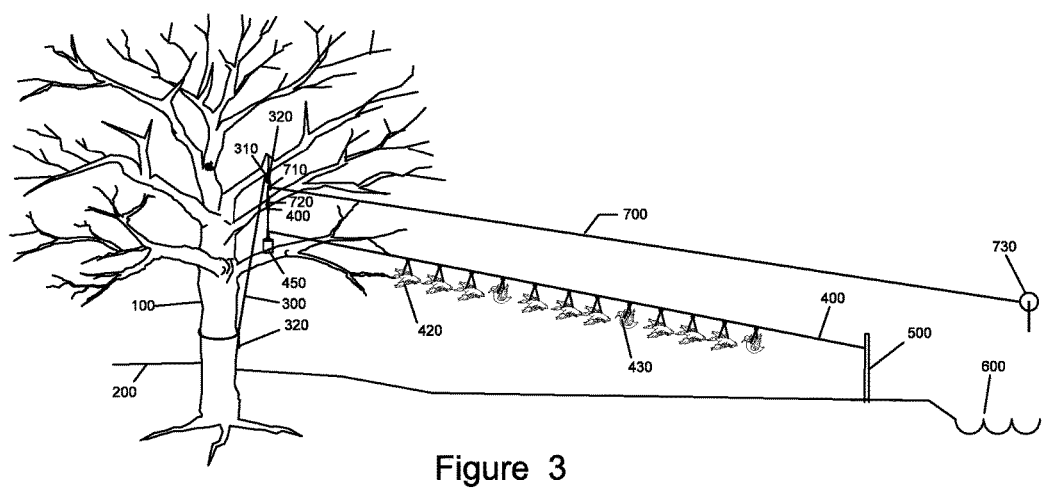
FIG. 3 is a front view of the present invention.
Figure 4:
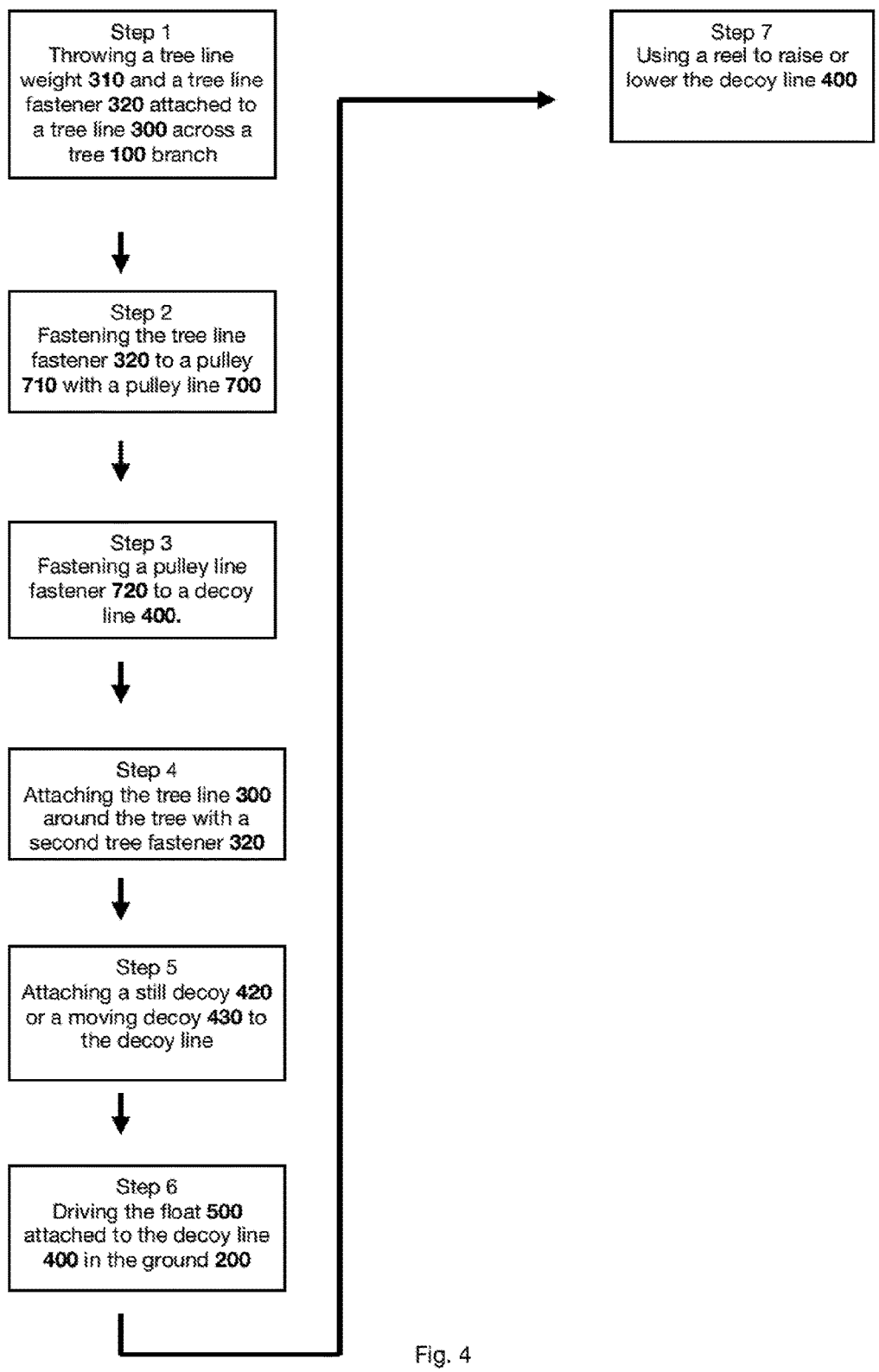
FIG. 4 is a flow chart of the method of the present invention.

The system in FIG. 3 adds a pulley line 700. The advantage of the pulley line 700 allows the decoy line 400 to move up and down on one end while the other end remains fixed to the float 500. The pulley line 700 goes through the pulley 710. The pulley line 700 has a pulley line fastener 720 on one end and a reel 730 on the other end. The reel 730 can include a hand ratchet, winch, hand-crank, spool, winder, or a mechanize version of any of those. The pulley 710 is attached to the tree line fastener 320. The pulley line fastener 720 can be attached to the decoy line fastener 440. The pulley line fastener 720 can be attached directly to the decoy line 400. A decoy line weight 450 can be attached to assist in moving the decoy line closer or farther away from the ground 200.

Figure 5:
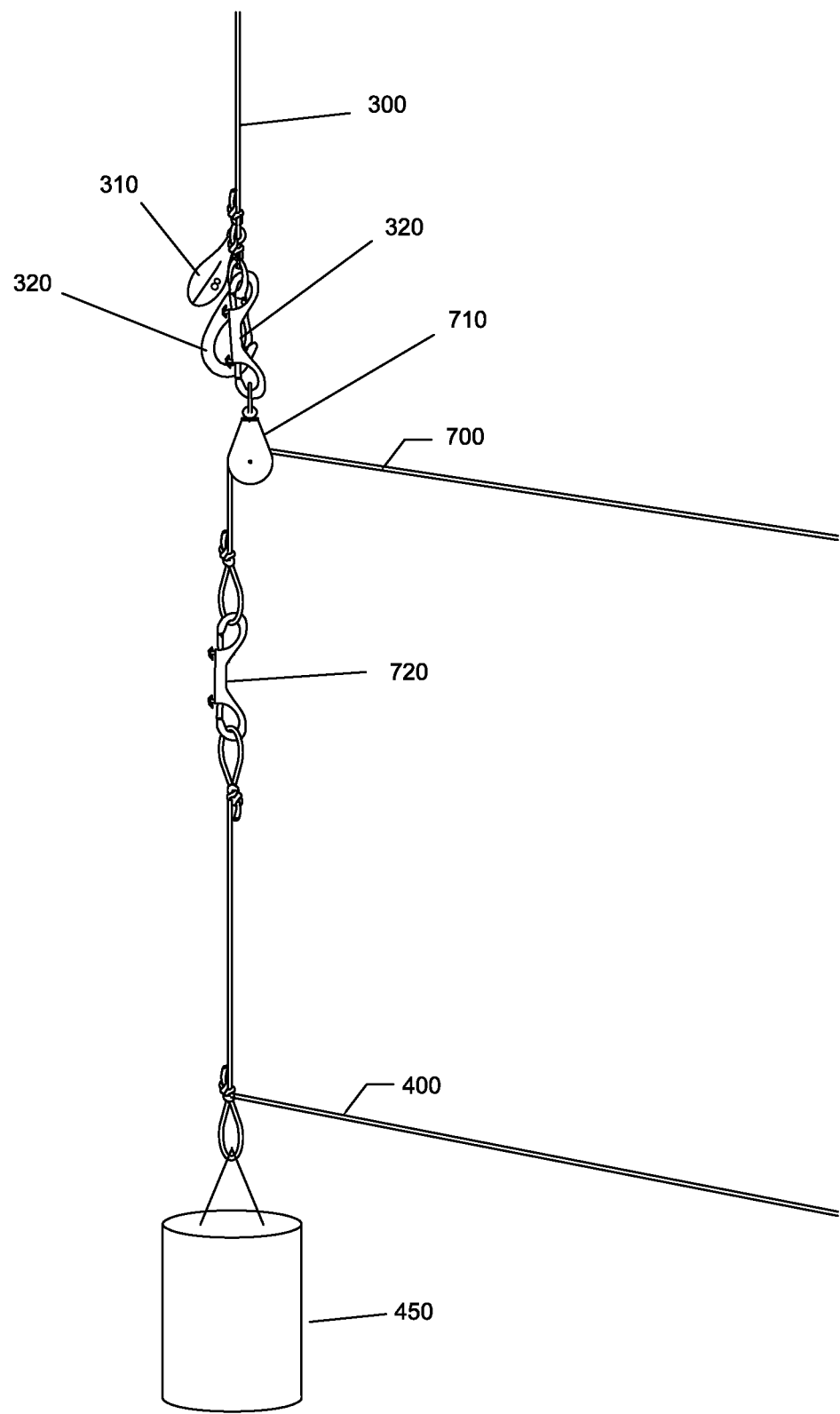
FIG. 5 is a close-up view of part of the present invention.

FIG. 5 shows a close-up of how the lines attach together. The tree line 300 has two separate fasteners 320 so that more than one pulley line 700 or decoy line 400 may be attached. The tree line weight 310 also is attached to the tree line 300. The tree line weight 310 is often attached near one end of the tree line 300. The tree line fastener 320 attaches to the pulley 710. The pulley line 700 runs through the pulley 710 and has a pulley line fastener 720 attached to the decoy line 400. Instead of the decoy line 400 fastening to the pulley line fastener 720 the decoy line 400 may have its own decoy line fastener 440 and be attached directly to the pulley line 700. The decoy line weight 450 is attached near the end of the decoy line 400. The decoy line weight 450 may be any size or shape.

The system shown in FIGS. 1-3, and 5 can be hung horizontally, vertically or high to low to simulate the flight of any decoy.

The method of using the system shown in FIGS. 1-3 and 5. The first step is the users throws tree line weight 310 with tree line 300 attached over a branch of the tree 100. Then, the user secures the tree line fastener 320, which is nearest to the tree line weight 310, to the pulley 710 with the pulley line 700 running through it. The user then attaches tree line 300 around the tree 100 by attaching the tree line fastener 320 on the opposite end of the tree line 300 around the tree 100. The user then attaches the decoy line 400 to the pulley line fastener 720. Next, the still decoys 420 and/or the moving decoys 430 are added to the loops 410. The float 500 attached to the second end of the decoy line 400 is driven into the ground 200. The user then uses the reel 730 to raise and lower the decoy line 400 as necessary.

What is claimed is:
1. A decoy spread system comprising: a tree line attached on a first end with a tree line fastener around a tree; said tree line with a tree line weight and a second tree line fastener on a second end; the second tree line fastener attached to a pulley with a pulley line running through the pulley; a pulley line fastener at one end of the pulley line attached to a decoy line; the decoy line having at least one still decoy attached to a loop; the decoy line attached on the other end of the decoy line to a float driven into the ground; the pulley line attached at the other end to a reel.

2. The system in claim 1 where more than one still decoy is attached.

3. The system in claim 1 where more than one moving decoy is attached.

4. The system in claim 1 where more than one still decoy and more than one moving decoy are attached.

5. A method of setting up a decoy spread comprising throwing a tree line with a tree line weight and a tree line fastener attached over a branch of a tree; attaching the tree line fastener to a pulley with a pulley line running through the pulley; attaching a tree line around the tree by first attaching a second tree line fastener on an opposite end of the tree line around the tree; attaching a decoy line to a pulley line fastener on one end of the pulley line; adding at least one still decoy to a loop; attaching the other end of the pulley line to a float; driving the float into a ground; using a reel attached to the other end of the pulley line to move raise and lower the pulley line.

6. The system in claim 5 where more than one still decoy is attached.

7. The system in claim 5 where more than one moving decoy is attached.

8. The system in claim 5 where more than one still decoy and more than one moving decoy are attached.

\* \* \* \* \*